(12) United States Patent
Antos et al.

(10) Patent No.: US 7,184,636 B2
(45) Date of Patent: Feb. 27, 2007

(54) METHOD OF CONTROLLABLY DOPING A GLASSY OPTICAL PREFORM WITH WATER

(75) Inventors: A. Joseph Antos, Elmira, NY (US); Dana C. Bookbinder, Corning, NY (US); Richard M. Fiacco, Corning, NY (US); Kevin B. Sparks, Corning, NY (US)

(73) Assignee: Corning Incorporated, Corning, NY (US)

( * ) Notice: Subject to any disclaimer, the term of this patent is extended or adjusted under 35 U.S.C. 154(b) by 365 days.

(21) Appl. No.: 11/074,886

(22) Filed: Mar. 7, 2005

(65) Prior Publication Data

US 2005/0163443 A1 Jul. 28, 2005

Related U.S. Application Data

(63) Continuation of application No. 10/044,452, filed on Jan. 11, 2002, now Pat. No. 6,885,787.

(60) Provisional application No. 60/261,611, filed on Jan. 12, 2001.

(51) Int. Cl.
*G02B 6/02* (2006.01)
*C03B 37/018* (2006.01)
*C02C 13/04* (2006.01)

(52) U.S. Cl. .......................... 385/123; 65/399; 65/416

(58) Field of Classification Search ........ 385/123–124, 385/126–127; 65/385, 387, 399, 413–416, 65/427

See application file for complete search history.

(56) References Cited

U.S. PATENT DOCUMENTS

| 4,367,013 A | 1/1983 | Guerder et al. .......... 350/96.34 |
| 4,385,802 A | 5/1983 | Blaszyk et al. .......... 350/96.33 |
| 4,504,297 A | 3/1985 | Kosinski et al. ............. 65/3.11 |
| 4,846,867 A * | 7/1989 | Yokota et al. ................ 65/397 |
| 5,522,007 A | 5/1996 | Drouart et al. ............. 385/141 |
| 6,189,342 B1 * | 2/2001 | Berkey ....................... 65/412 |
| 2003/0213268 A1 | 11/2003 | Homa ......................... 65/390 |

FOREIGN PATENT DOCUMENTS

| EP | 0 547 335 A2 | 10/1992 |
| JP | 60-255646 | 12/1985 |
| JP | 62-178203 | 8/1987 |
| WO | WO 00/64825 | 11/2000 |

OTHER PUBLICATIONS

MicroPatent Report of JP60255646A, Furukawa Electric Co Ltd, "Optical Fiber of Quartz", filed Jun. 27, 1983.
MicroPatent Report of JP62178203A, Mitsubishi Cable Ind Ltd, "Single Mode Optical Fiber", filed Jan. 31, 1986.

* cited by examiner

*Primary Examiner*—Akm Enayet Ullah
*Assistant Examiner*—Jerry T Rahll
(74) *Attorney, Agent, or Firm*—Joseph M. Homa (57) ABSTRACT

A method of manufacturing a glassy optical preform is disclosed that includes providing a preform having a silica soot layer and then sintering the soot layer into a glassy layer, and water is selectively added to the preform by exposing the soot layer to a gaseous water-containing atmosphere during the sintering step. The preform is controllably doped with water.

20 Claims, 3 Drawing Sheets

METHOD OF CONTROLLABLY DOPING A GLASSY OPTICAL PREFORM WITH WATER

RELATED APPLICATIONS

This is a continuation of U.S. patent application Ser. No. 10/044,452 filed on Jan. 11, 2002, now U.S. Pat. No. 6,885,787 the content of which is relied upon and incorporated herein by reference in its entirety, and the benefit of priority under 35 U.S.C. § 120 is hereby claimed. This application further claims the benefit of the priority date of U.S. Provisional patent application No. 60/261,611, filed on Jan. 12, 2001, entitled "Optical Fiber and Preform, Method of Manufacturing Same, and Optical Component Made Therefrom".

BACKGROUND OF THE INVENTION

1. Field of the Invention

The present invention relates generally to the field of optical waveguide fibers and passive optical component such as optical couplers, and more particularly to optical waveguide fibers used in the manufacture of fiber optic couplers.

2. Technical Background

As is well known, electromagnetic radiation traveling through an optical waveguide fiber is subject to attenuation or loss due to several mechanisms.

Such as attenuation due to absorption by the optical waveguide fiber due to impurities present in the light guiding region of the fiber. Particularly troublesome is the attenuation caused by the hydroxyl radical (OH), which can be formed in the optical waveguide fiber when a source of hydrogen is present in the fiber material, or when hydrogen available from several sources during the fiber manufacturing process diffuses into the glass. Silica bodies of the type used in optical fiber and optical fiber preform manufacture can contain a substantial amount of OH. Generally speaking, the hydrogen bonds with the oxygen available in the $SiO_2$ and/or $GeO_2$ and/or other oxygen containing compound in the glass matrix to form the OH and/or $OH_2$ bonds referred to generally as "water".

Historically, much effort has been expended to reduce the amount of water in optical fibers; until recently, telecommunications systems avoided the so-called "water peak" residing in the 1380 nm window (at which the attenuation is considerably higher than wavelengths above and below this peak) by operating in the 1310 nm window and/or the 1550 nm window, among others. With the advent of wavelength division multiplexing ("WDM") and advancements in amplifier technology, which enable telecommunications systems to operate over broad wavelength ranges, it is now more likely that all wavelengths between about 1300 nm and about 1650 nm may be used for data transfer in optical telecommunications systems. Thus, removing water from optical waveguide fiber used with such systems has been and continues to be an important objective for enabling system operation, of higher capacity and better quality over a wider range of wavelengths, and especially for telecommunications systems which operate over long distances.

Furthermore, optical fiber networks, or optical fiber access networks, are expanding. Optical components commonly used in fiber optic devices, networks, and systems include optical couplers which may function as combiners or splitters. Couplers typically combine light propagating on at least two optical fibers, or split light propagating through an optical fiber so as to further propagate the light on at least two fibers. Optical couplers are also used for combining light of different wavelengths. In optical fiber amplifiers, couplers are typically used to feed pump light into a signal fiber. Couplers can also be used in wavelength multiplexed networks to add and drop channels.

In general, a coupler may be identified as a comprising two or more waveguides or fibers disposed in close proximity to each other wherein the mode fields of the adjacent waveguides overlap at least to some degree. Coupling can occur between two closely spaced cores or optical paths in passive optical devices. Such devices exist in the form of fused fibers, overclad fused fibers, planar devices and the like.

Certain types of fiber optic systems require couplers in which at least a portion of the light propagating in one or two optical fibers is coupled to or switched between two output fibers. Possible commercial embodiments of such 1×2 and 2×2 fiber optic couplers include devices such as 3 dB couplers, achromatic couplers, taps, wavelength division multiplexers (WDMs), switches and the like.

Wavelength division multiplexing is employed in fiber optic communication systems and local area networks to increase data transmission capacities. Various wavelength multiplexer/demultiplexers are available, such as high bandwidth, low loss single-mode fiber telemetry systems.

WDM couplers are used for the splitting of wavelengths. WDM couplers may be manufactured using a process called Fused Biconical Taper (FBT) technology. An FBT fiber coupler comprises two or more optical fibers whose optical claddings have been fused together. The fibers are heated and tapered by elongation until desired coupling properties are achieved for allowing the transfer of light between the fibers.

The Erbium Doped Fiber Amplifier (EDFA), which operates at an operating window around a 1550 nm wavelength, is an important component in long haul fiber optic network. The EDFA amplifies transmission signals by use of a 980 or 1480 nm pump laser. The pump wavelength (980 or 1480 nm) is introduced to excite the erbium doped in a piece of fiber, so that as a transmission signal in the 1550 nm window passes through the fiber, the signal is boosted and exits the amplifier. WDM couplers are commonly used in such amplifiers to combine pump and signal wavelength(s), thereby enabling amplification of the signal wavelength(s).

SUMMARY OF THE INVENTION

In one aspect, the present invention concerns an optical waveguide fiber comprising a core and a cladding surrounding the core, wherein the cladding contains at least 190 ppm water within at least 20% of its outer periphery in a radial direction. In a preferred embodiment, an optical fiber coupler comprises at least one such fiber. In one preferred embodiment, the cladding contains substantially no chlorine. In another preferred embodiment, the cladding contains no chlorine.

In another aspect, the present invention relates to an optical waveguide fiber comprising a core and a cladding surrounding the core, wherein the cladding comprises an inner cladding and an overcladding, and wherein at least a portion of the overcladding contains at least 300 ppm water. In a preferred embodiment, at least a portion of the overcladding contains at least 350 ppm water. In a preferred embodiment, an optical fiber coupler comprises at least one such fiber.

In yet another aspect, the present invention relates to an optical waveguide fiber comprising a core and a cladding surrounding the core, wherein at least a portion of the cladding contains at least 300 ppm water. In a preferred embodiment, an optical fiber coupler comprises at least one such fiber.

In still another aspect, the present invention relates to a first optical waveguide body of fused silica material for fusing to at least one other optical waveguide body of fused silica material, the first body comprising a contact surface, wherein at least a portion of the contact surface is capable of being fused to the at least one other body, wherein the first body contains at least 150 ppm water at or near the contact surface, and wherein at least a portion of the first optical waveguide body contains at least 300 ppm water.

In one preferred embodiment, the first optical waveguide body contains at least 190 ppm water at or near the contact surface. In another preferred embodiment, at least a portion of the first optical waveguide body contains at least 350 ppm water.

In one preferred embodiment, the contact surface is substantially planar. In another preferred embodiment, the contact surface is curved.

In another preferred embodiment, an optical fiber coupler comprises the first optical waveguide body.

In yet another aspect, the present invention relates to an optical fiber coupler comprising a plurality of optical waveguide fibers, each fiber having at least a portion fused to the other fibers, wherein at least one of the fibers comprises an overclad region surrounding the core, wherein at least a portion of the overclad region is doped with $H_2O$ and/or $D_2O$. In a preferred embodiment, at least a portion of the overclad region contains at least one other dopant selected from the group consisting of $GeO_2$, $B_2O_3$, and F.

In still another aspect, the present invention relates to an optical fiber coupler comprising a plurality of optical waveguide fibers, each fiber having at least a portion fused to the other fibers, wherein at least one of the fibers comprises an overclad region surrounding the core, wherein at least a portion of the overclad region contains at least two dopants. Preferably, the dopants are selected from the group consisting of $H_2O$, $D_2O$, $GeO_2$, $B_2O_3$, F and Cl.

In another aspect, the present invention relates to a method of forming an optical waveguide fiber preform comprising the steps of: providing a core cane; depositing a sooty overclad layer on the core cane to form a sooty overclad preform; doping the sooty overclad layer to form a doped sooty overclad preform; and sintering the doped sooty overclad preform to form a glassy optical waveguide fiber preform; wherein the doping step comprises selectively adding water to the sooty overclad layer. In one preferred embodiment, the sooty overclad layer is not dried. In another preferred embodiment, the sooty overclad layer is not dried with chlorine. In still another preferred embodiment, the doping step further comprises exposing the sooty overclad layer to $H_2O$ and/or $D_2O$. In yet another preferred embodiment, the doping step comprises exposing the sooty overclad layer to higher than ambient humidity. Preferably, the doping occurs in an elevated temperature chamber. In a preferred embodiment, the doping step further comprises exposing the sooty overclad layer to at least one dopant selected from the group consisting of $GeO_2$ and $B_2O_3$. In another preferred embodiment, the doping step further comprises exposing the sooty overclad layer to at least two dopants selected from the group consisting of $GeO_2$, $B_2O_3$, and F. The preform may be drawn into an optical waveguide fiber.

In another aspect, the present invention relates to a method of forming an optical waveguide fiber preform comprising the steps of: providing a core cane; depositing a sooty overclad layer on the core cane to form a sooty overclad preform; doping the sooty overclad layer with at least two dopants to form a doped sooty overclad preform; and sintering the doped sooty overclad preform to form a glassy optical waveguide fiber preform. In a preferred embodiment, the doping step comprises selectively adding water to the sooty overclad layer. In another preferred embodiment, the doping step further comprises exposing the sooty overclad layer to $H_2O$ and/or $D_2O$. In still another preferred embodiment, the sooty overclad layer is doped with dopants selected from the group consisting of $GeO_2$, $B_2O_3$, F and Cl. The preform may be drawn into an optical waveguide fiber.

In still another aspect, the present invention relates to a method of forming an optical waveguide fiber comprising the steps of: providing a silica soot tube; doping the silica soot tube; sintering the silica soot tube into a doped fused silica tube; depositing soot material inside the doped fused silica tube to form a doped-overclad soot preform; and sintering and drawing the doped-overclad soot preform into the optical waveguide fiber. The step of sintering and drawing may further comprise sintering the doped-overclad soot preform to form a glassy optical waveguide fiber preform, then drawing the glassy optical waveguide fiber preform into the optical waveguide fiber. In a preferred embodiment, the doping step comprises selectively adding water to the silica soot tube. Preferably $H_2O$ and/or $D_2O$ is selectively added to the silica soot tube.

In one aspect, the present invention concerns an optical waveguide fiber comprising a core and a cladding surrounding the core, wherein the cladding preferably contains at least 50 ppm water at or near its outer periphery. Even more preferably, the cladding contains at least 100 ppm water at or near its outer periphery. In another preferred embodiment, the fiber contains at least 190 ppm water within at least 20% of its outer periphery in a radial direction.

The cladding may comprise an inner cladding and an overcladding. In a preferred embodiment, the inner cladding contains substantially less water than the overcladding. In another preferred embodiment, at least a portion of the overcladding contains at least 300 ppm water. In yet another preferred embodiment, at least a portion of the overcladding contains at least 350 ppm water.

In one preferred embodiment, the overcladding contains substantially no chlorine. In another preferred embodiment, the overcladding contains no chlorine.

In another embodiment, the present invention relates to an optical waveguide fiber comprises a core and a cladding surrounding the core, wherein at least a portion of the cladding contains at least 300 ppm water.

In yet another embodiment, the present invention relates to a first optical waveguide body of fused silica material for fusing to at least one other optical waveguide body of fused silica material. The first body comprises a contact surface, wherein at least a portion of the contact surface is capable of being fused to the at least one other body, and wherein the first body contains at least 150 ppm water at or near the contact surface. The first optical waveguide body may preferably contain at least 190 ppm water at or near the contact surface. At least a portion of the first optical waveguide body may preferably contain at least 300 ppm water. At least a portion of the first optical waveguide body may preferably contain at least 350 ppm water. The contact surface may be substantially planar, the surface may be curved.

In still another embodiment, the present invention relates to an optical waveguide fiber comprising a core and an overclad region surrounding the core, wherein at least a portion of the overclad region contains at least one of $GeO_2$ and $B_2O_3$. The overclad region may preferably contain substantially no chlorine. At least a portion of the overclad region may preferably contain at least two dopants selected from the group consisting of $GeO_2$, $B_2O_3$, and Cl.

In yet another embodiment, the present invention relates to a coupler fiber comprising a core and an overclad region surrounding the core, wherein at least a portion of the overclad region contains at least two dopants selected from the group consisting of $H_2O$, $D_2O$, $GeO_2$, $B_2O_3$, F, and Cl.

In another aspect, the present invention relates to an optical fiber coupler comprising a plurality of optical waveguide fibers, each fiber having at least a portion fused to the other fibers, wherein at least one of the fibers comprises an overclad region surrounding the core, wherein at least a portion of the overclad region contains at least one dopant, and wherein at least a portion of the overclad region contains substantially no chlorine. In preferred embodiment, at least one dopant is water. In another preferred embodiment, at least one dopant is selected from the group consisting of $H_2O$, $D_2O$, $GeO_2$, $B_2O_3$, and F. At least a substantial portion of the overclad region may preferably contain no chlorine.

In another embodiment, the present invention concerns an optical fiber coupler comprising a plurality of optical waveguide fibers, each fiber having at least a portion fused to the other fibers, wherein at least one of the fibers comprises an overclad region surrounding the core, wherein at least a portion of the overclad region contains at least two dopants. The dopants may preferably be selected from the group consisting of $H_2O$, $D_2O$, $GeO_2$, $B_2O_3$, F and Cl.

In yet another aspect, the present invention concerns a method of forming an optical waveguide fiber preform comprising the steps of: providing a core cane; depositing a sooty overclad layer on the core cane to form a sooty overclad preform; doping the sooty overclad layer to form a doped sooty overclad preform; and sintering the doped sooty overclad preform to form a glassy optical waveguide fiber preform. Preferably, doping occurs in an elevated temperature chamber. The doping and sintering steps are preferably carried out in a substantially chlorine free environment. The sooty overclad layer may preferably not be dried. Moreover, the sooty overclad layer may preferably not be dried with chlorine. In a preferred embodiment, the doping step comprises selectively adding water to the sooty overclad layer, and the doping step may further comprise exposing the sooty overclad layer to $H_2O$ and/or $D_2O$. In another preferred embodiment, the doping step may comprise exposing the sooty overclad layer to higher than ambient humidity. The doping step may also preferably comprise exposing the sooty overclad layer to at least one dopant selected from the group consisting of $GeO_2$ and $B_2O_3$. In another preferred embodiment, the doping step further comprises exposing the sooty overclad layer to at least two dopants selected from the group consisting of $GeO_2$, $B_2O_3$, and F.

In still another aspect, the present invention concerns a method of forming an optical waveguide fiber preform comprising the steps of: providing a core cane; depositing a sooty overclad layer on the core cane to form a sooty overclad preform; doping the sooty overclad layer with at least two dopants to form a doped sooty overclad preform; and sintering the doped sooty overclad preform to form a glassy optical waveguide fiber preform. The doping step may preferably comprise selectively adding water to the sooty overclad layer, and the doping step may further preferably comprise exposing the sooty overclad layer to $H_2O$ and/or $D_2O$. In another embodiment, the sooty overclad layer is doped with dopants selected from the group consisting of $GeO_2$, $B_2O_3$, F and Cl.

The present invention is further concerned with a method of forming an optical waveguide fiber preform comprising the steps of: providing a core cane; depositing a sooty overclad layer on the core cane to form a sooty overclad preform; doping the sooty overclad layer in a substantially chlorine free environment to form a doped sooty overclad preform; and sintering the doped sooty overclad preform in a substantially chlorine free environment to form a glassy optical waveguide fiber preform. The step of doping may preferably comprise selectively adding water to the sooty overclad layer, may further preferably comprise exposing the sooty overclad layer to $H_2O$ or $D_2O$. In another embodiment, the method may preferably further comprise exposing the sooty overclad layer to at least two dopants selected from the group consisting of $GeO_2$, $B_2O_3$, and F.

In another aspect, the present invention is concerned with a method of forming a coupler fiber from a sooty overclad preform comprising the steps of: doping the sooty overclad layer in a substantially chlorine free environment to form a doped sooty overclad preform; sintering the doped sooty overclad preform in a substantially chlorine free environment to form a glassy optical waveguide fiber preform; and drawing the glassy optical waveguide fiber preform into the fiber. The step of doping may preferably comprise doping the sooty overclad layer with water, and more preferably may comprise exposing the sooty overclad layer to $H_2O$ or $D_2O$. The method may also preferably comprise exposing the sooty overclad layer to at least one dopant selected from the group consisting of $GeO_2$, $B_2O_3$, and F. The method sintering and drawing steps may optionally be performed simultaneously.

The present invention also relates to a method of forming an optical waveguide fiber from a preform having a soot outer layer comprising doping the soot outer layer with water such that the outer layer has at least 150 ppm water at or near its outer periphery.

The present invention also further relates to a method of forming an optical waveguide fiber comprising the steps of: providing a silica soot tube; doping the silica soot tube; sintering the silica soot tube into a doped fused silica tube; depositing soot material inside the doped fused silica tube to form a doped-overclad soot preform; and sintering and drawing the doped-overclad soot preform into the optical waveguide fiber. The step of sintering and drawing may preferably comprise sintering the doped-overclad soot preform to form a glassy optical waveguide fiber preform, then drawing the glassy optical waveguide fiber preform into the optical waveguide fiber. The doping step may preferably comprise selectively adding water to the silica soot tube.

An optical fiber coupler may preferably comprise at least one of the above fibers and/or bodies, and one or more of the above methods may be performed to produce at least some part or portion of an optical coupler.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numerals will be used throughout the drawings to refer to the same or like parts.

Various methods and apparatuses for forming a fused optical coupling between fibers are known. Typically, coupling involves removing the jacket from a portion of each of two fibers, mechanically contacting, twisting, or otherwise preloading the bare cladding or overcladding of the fibers against each other, and then applying heat to fuse the fibers while simultaneously drawing and elongating the heated portion. The drawing of tapers out of the fibers brings the cores into sufficient proximity so that, when light is propagated through the fiber, optical coupling occurs between the cores. Fused fiber couplers have been formed by positioning a plurality of fibers in a side-by-side relationship along a suitable length thereof and fusing the claddings together to secure the fibers and reduce the spacings between the cores. Various coupler properties can be improved by inserting the fibers into a capillary tube to form a coupler preform prior to heating and stretching the fibers, thereby resulting in the formation of an "overclad coupler".

Overclad couplers of the 1×2 and 2×2 type can be, made by inserting two suitably prepared glass optical fibers, each having a core and cladding, into the longitudinal bore of a glass tube such that the ends of each fiber extend beyond one or both of the ends of the tube, depending upon whether a 1×2 or 2×2 is being made. A portion of the coating is removed from each fiber, and the uncoated portions of the fibers are disposed within the tube bore to form a coupler preform. The midregion of the coupler preform is collapsed around the fibers, and the central portion of the midregion is stretched to elongate the fibers and reduce their diameter. Stretching is discontinued when the desired coupling has been achieved. A sealant such as UV curable epoxy may then be applied to the ends of the tube bore. The resultant coupler may be referred to as an overclad fused coupleror overcladed coupler. See U.S. Pat. No. 5,754,720 (Quinn et al.). Also see U.S. Pat. No. 4,834,481 which describes one type of single-mode fused coupler which acts as a wavelength multiplexer/demultiplexer at wavelengths of 1320 nm and 1550 nm.

A 1×2 coupler can be made by cutting one of the two fibers near the fused section, wherein the cut fiber does not reflect lightwaves. Similarly, 1×3 or 2×3 couplers can be made using three optical fibers which are pulled and fusioned simultaneously. Likewise, N×N couplers (or 1×N, 2×n, etc.) can be produced.

Typically a fused fiber coupler possesses a fused, tapering section having a length of 5 to 70 mm, depending on coupling ratio, wavelength range, and other factors. The overall length of 1×2 and 2×2 couplers is typically 20 to 100 mm. The fused section is typically protected by a synthetic resin material and/or a housing.

Figure 1:
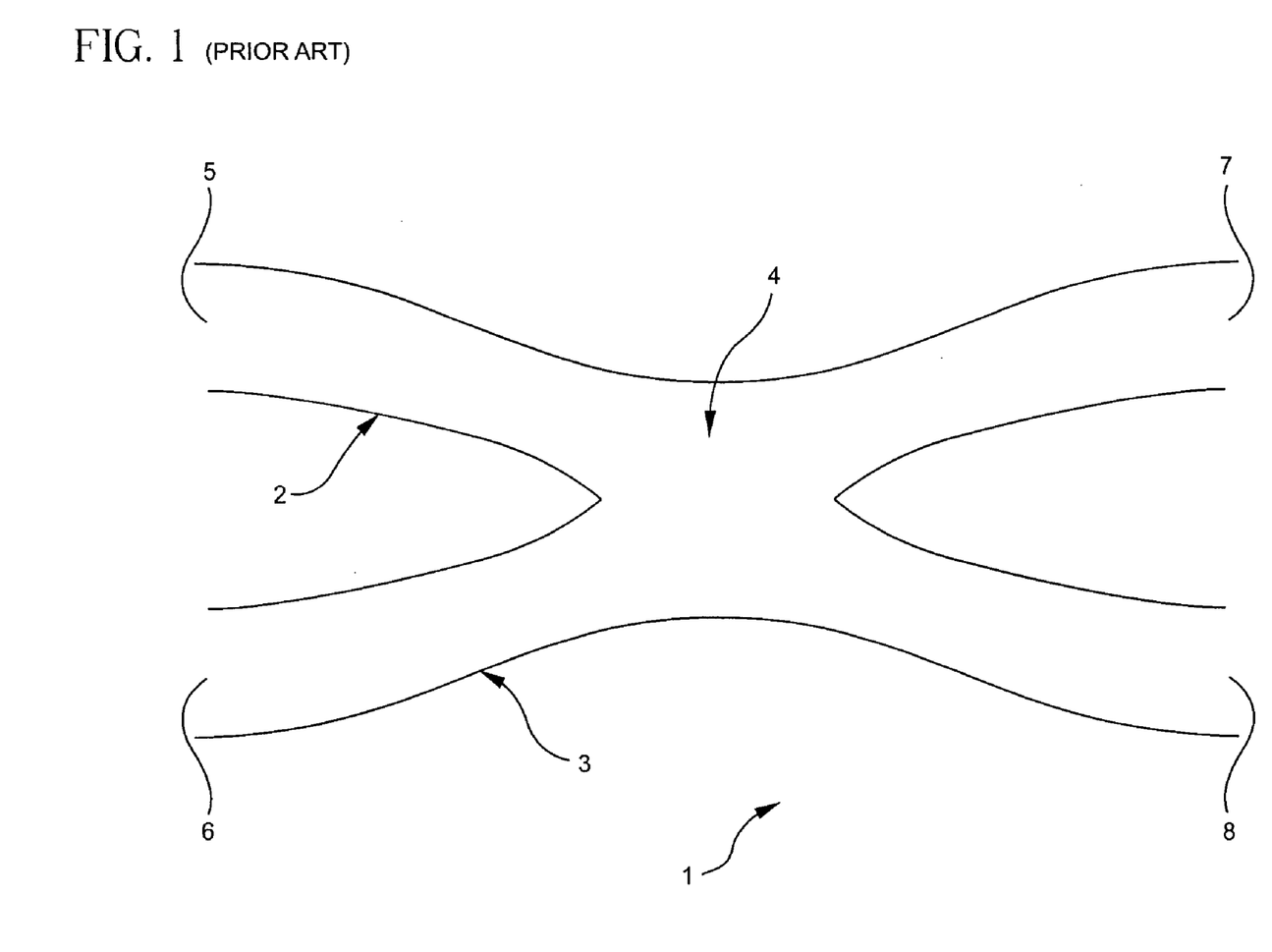
FIG. 1 is a schematic illustration of a typical known WDM coupler.

FIG. 1 shows a prior art bi-directional WDM coupler 1 having two fibers 2, 3 whose optical cladding has been fused together to form a coupling region 4, as discussed in PCT International Application WO 00/50943 (Burke et al.). The WDM coupler has two input ports 5, 6 and two output ports 7, 8. Light entering an input port 5 at two different wavelengths $\lambda_1$, $\lambda_2$ is separated into the two components $\lambda_1$ and $\lambda_2$. In an ideal WDM coupler the wavelength separation is complete, wherein 100% of $\lambda_1$ exits the coupler through output port 7 and 100% of 2 exits through output port 8. This degree of separation is not achieved in actual couplers. That is, some percentage of $\lambda_1$ will also exit through output port 8 and some percentage of 2 will exit through port 7. Wavelength isolation, or crosstalk, is a measure of how well the different wavelengths are separated at the two output ports. Isolation is typically measured in dB. Referring to FIG. 1, isolation can be defined as:

isolation k=−10log ($\lambda_1$(port 8)/$\lambda_1$(port 7))

where $\lambda_1$(port 8) is the amount of light at wavelength $\lambda_1$ passing through port 8, and $\lambda_1$(port 7) is the amount of light at wavelength $\lambda_1$ passing through port 7.

In accordance with the invention, soot preform or soot body is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body. The soot body may be formed, for example, by depositing layers of soot onto a bait rod via an OVD process.

The substrate or bait rod or mandrel is mounted on a lathe which rotates and translates the mandrel in close proximity with a soot-generating burner. As the mandrel is rotated and translated, silica-based reaction product, known generally as soot, is directed toward the mandrel. At least a portion of the silica-based reaction product is deposited on the mandrel and on a portion of handle to form a soot body thereon. It will be understood by those skilled in the art that the soot generating burner can traverse rather than the mandrel. Moreover, this aspect of the present invention is not intended to limit soot deposition to an OVD process. Rather, other methods of chemically reacting at least some of the constituents of a moving fluid mixture, such as, but not limited to, liquid delivery of at least one glass-forming precursor compound in an oxidizing medium can be used to form the silica-based reaction product of the present invention. Moreover, other processes, such as, for example, the inside vapor (IV) deposition process, and modified chemical vapor deposition (MCVD) process, as well as the vapor axial deposition (VAD) are also applicable to the present invention.

Once the desired quantity of soot has been deposited on the mandrel, soot deposition is terminated and the mandrel is removed from the soot body.

Upon removal of the mandrel the soot body defines a centerline hole passing axially therethrough. Preferably, the soot body is then downfed into a consolidation furnace.

The soot body is preferably chemically dried, for example, by exposing the soot body to a chlorine containing atmosphere at elevated temperature within the consolidation furnace. The chlorine containing atmosphere effectively removes water and other impurities from the soot body, which otherwise would have an undesirable effect on the properties of optical waveguide fiber manufactured from the soot body. In an OVD formed soot body, the chlorine flows sufficiently through the soot to effectively dry the entire blank, including the region surrounding centerline hole.

Following the chemical drying step, the temperature of the furnace is elevated to a temperature sufficient to consolidate the soot blank into a sintered glass preform, preferably about 1500° C. The centerline hole may be preferably fully closed during the consolidation step and thereafter to prevent rewetting of the centerline hole region. Drying and consolidation may optionally occur simultaneously. Preferably, the sintered glass preform is held at an elevated temperature, preferably in a holding oven, to allow inert gas to diffuse therefrom. Various methods for closing the centerline hole are known.

Following the above-described steps, the sintered glass preforms can be removed from the consolidation furnace and thereafter stored for further processing at a later time, preferably within a holding oven, or positioned within a redraw furnace where the glass preforms can be drawn into a reduced diameter cylindrical glass body such as a core cane, if desired.

At redraw, the sintered glass preforms formed as described above are suspended within a furnace by downfed handles. The temperature within the furnace is elevated to a temperature which is sufficient to stretch the glass preforms, preferably about 1950° C. to about 2100° C., and thereby reduce the diameters of the preforms to form a cylindrical glass body such as a core cane. The reduced core cane preferably has a cladding layer surrounding a core region.

Figure 2:
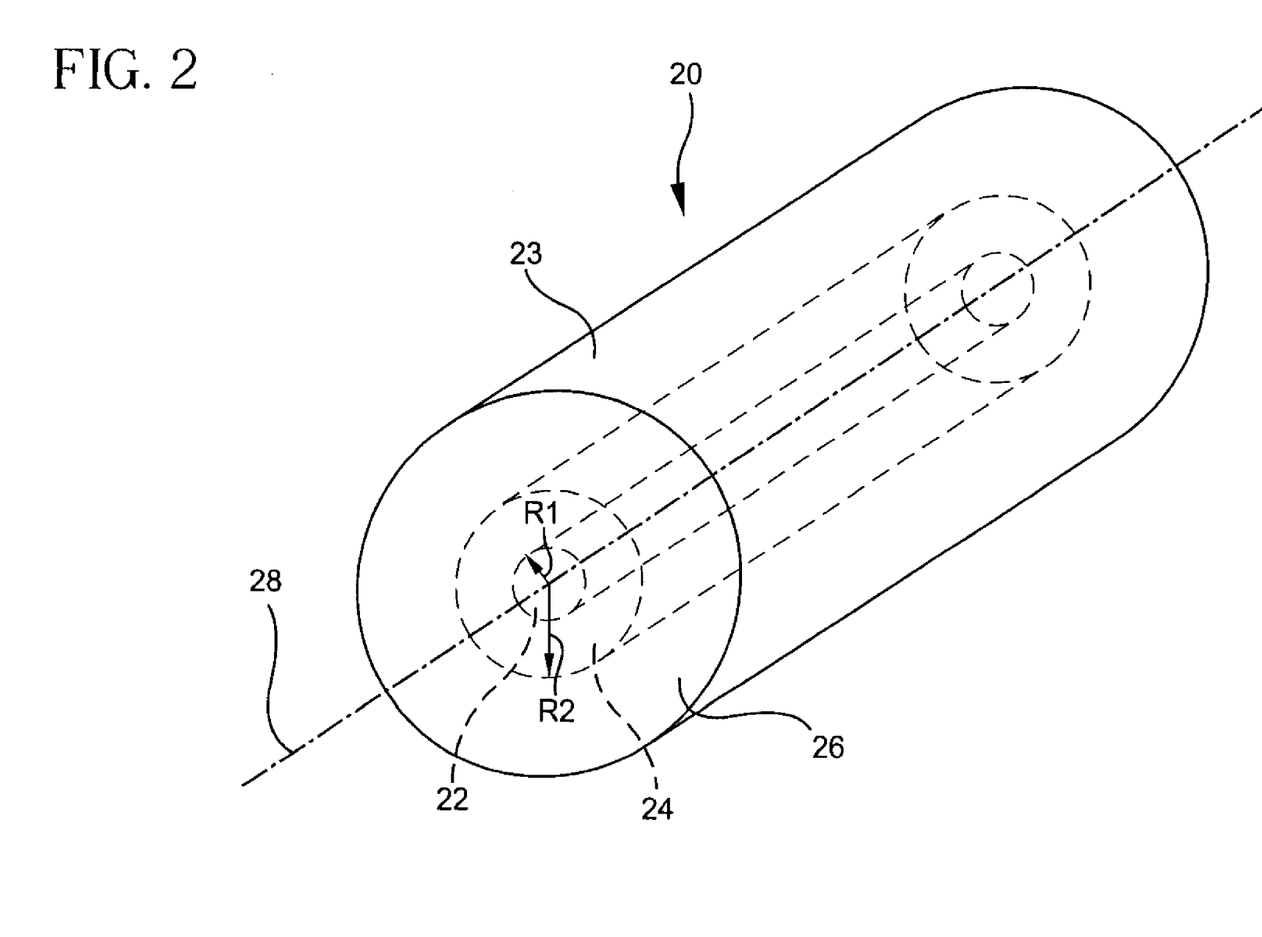
FIG. 2 is a perspective view of a cylindrical glass body representative of an optical fiber preform or an optical fiber.

The reduced diameter core cane, a portion of which preferably constitutes cladding, produced by any of the above-described methods or by other methods known in the art, is overclad, such as by further soot deposition, for example by an OVD process, or with a rod-in-tube arrangement, and subsequently drawn into an optical waveguide fiber having a central core portion bounded by a cladding glass. FIG. 2 schematically represents a cylindrical glass body representative of an optical fiber preform or an optical fiber, 20, which includes a core region 22 and a clad region 23, the clad region 23 in the Figure including an inner cladding 24 and an overcladding 26.

In one preferred embodiment of the present invention, the core is germania doped silica, the core is surrounded by an inner cladding of pure $SiO_2$, and the overclad soot layer surrounding the inner cladding is pure $SiO_2$.

In typical prior known methods of producing a glassy fiber preform from an overclad preform, the overclad preform is dried, typically by $Cl_2$ gas, prior to consolidation, and drying may also occur during consolidation. Thus, drying the overclad preform dehydrates the sooty overclad layer. The dried sooty overclad preform was then sintered into a glassy optical waveguide fiber preform and drawn into a fiber. If the fiber were destined to be incorporated into an optical coupler, the final drying step was typically eliminated.

Prior to the present invention, it was not known how much water, if any, existed in the overclad region of the sintered glassy overclad preform, as measurements of the water content in the coupler fiber or its preform had not been not performed and were otherwise unknown. Furthermore, it was not known if the presence of water in the fiber made any appreciable difference in coupler performance after the fiber had been incorporated into a coupler. Accidentally, we were led to investigate the water content of the sintered glassy overclad preform derived from an undried sooty overclad produced by prior methodology. Our analysis of these sintered undried fiber preforms for coupler fiber showed random, uncontrolled water distribution throughout.

Surprisingly, we found that by adding additional water to the sooty overcladding of the preform in a controlled fashion, then sintering and drawing the preform into a coupler fiber, and subsequently incorporating the fiber into a coupler, coupler isolation was improved. Furthermore, we found dramatic improvement in the repeatability of manufacturing coupler fiber having desirable optical and physical properties, thereby improving overall process control, as further discussed hereinbelow.

In one preferred embodiment of the present invention, the overclad preform is preferably not dried. Instead, the overclad layer of the overclad preform is doped with water, preferably in a controlled fashion, resulting in a wet overclad preform, preferably having a desired water content in at least some portion of the preform. The wet overclad preform is then consolidated into a glassy optical fiber preform. The fiber preform can then be drawn into an optical waveguide fiber which is especially suitable for incorporation into an optical coupler.

In a preferred embodiment, doping the sooty overclad region of the overclad preform with water can be achieved by controlling the humidity in the atmosphere surrounding, or by introducing and/or controlling a flow of water vapor around or over, the overclad preform. Thus, the water content or the OH content of at least a portion of the overclad region of the preform can be controlled to a desired level. In particular embodiments, the water content of the overclad region of the overclad preform can be selectively, and preferably substantially, increased above a level that might otherwise occur under uncontrolled prior known manufacturing methods and/or conditions, for example such as might occur in the production of such preforms under uncontrolled and possibly varying environmental influences such as humidity.

Alternatively, or in addition, the water content or OH content of the overclad region of the overclad preform can preferably be controlled, and even more preferably increased, by exposing the sooty overclad region to $D_2O$ as a dopant.

Thus, as used herein, "water" or "water content" or "doping with water" refers, in a general sense, to OH and/or OD species in a host, and/or the introduction thereof into the host. For example, soot glass may be doped with $H_2O$ or $D_2O$, or both, as dopants. Other molecules or protonic sources may also have an H or D that are able to react with a silicate structure to form OH and OD, for example methanol ($CH_4OH$) or hydrogen ($H_2$).

Thus, the amount of water to which the sooty overclad preform is subjected can be selectively increased, decreased, or maintained to thereby adjust the amount of dopant water added thereto and/or contained therein.

An optical waveguide fiber made in accordance with the present invention can be advantageously implemented in an optical coupler. In particular, we have found that a high water content in the overclad region of the inventive fiber, and especially a high water content at or near the outer periphery of the inventive fiber, yields consistently high values of isolation in the resultant couplers. That is, a coupler according to the present invention which includes at least one fiber having a high water content overclad region exhibits increased isolation, or an increased ability to eliminate optical noise, over prior known constructions and methods of making couplers.

With neither the intention nor the need to be bound by any particular theory, we believe that adding water or $D_2O$ to the overclad region as a dopant has an effect on both the optical properties as well as the physical properties of the overclad region, and in particular the dopant tends to influence both the refractive index as well as the viscosity of the overclad region of the preform and the resultant optical waveguide fiber, especially at or near the outer periphery of the fiber. We believe that water (or OH) has only a slight effect on the refractive index of the overclad region, but has a large effect on reducing its viscosity, yielding beneficial physical and optical linking the manufacture of couplers, e.g. in order to improve the steps of fusing and drawing coupled fibers into a fused taper.

Other dopants, or co-dopants, of the overclad region may be used in accordance with the present invention, such as $GeO_2$, $B_2O_3$, or F, in order to achieve one or more optical and/or physical properties. For example, $GeO_2$ increases the refractive index and lowers the viscosity. Fluorine lowers the refractive index and lowers the viscosity. Chlorine, which tends to increase the refractive index and lower the viscosity, may also be used as a co-dopant, for example with fluorine, to achieve desired optical and physical properties.

An optical waveguide preform having a doped overclad region in accordance with the present invention may be formed by other than an OVD process. For example, soot may be deposited on the inner wall of a fused silica tube, as in inside vapor deposition, modified chemical vapor deposition (MCVD), plasma chemical vapor deposition, or plasma-enhanced chemical vapor deposition, wherein the fused silica tube has been previously doped with the desired dopant(s) such as water, i.e. prior to the consolidation of the fused silica tube. The present invention can also be used in conjunction with VAD processes.

The present invention applies to single mode as well as multimode fibers.

EXAMPLE

In a preferred embodiment, the overclad preform is down-driven or lowered into a consolidation furnace having a hot zone with a temperature greater than or equal to about 1500° C. Inside the furnace, the overclad preform encounters a counterflow gas stream of a mixture of 40 SLPM Helium and about 15,000 ppm water vapor. In one particular furnace configuration, the bulk of the helium gas was introduced from a primary helium tank source via a primary helium line. A line from a secondary helium tank source Was passed through a water bubbler flask containing water at 22° C. to produce a saturated secondary helium flow which was introduced into the primary helium line of a tee-connection via a secondary helium line. Valves Were provided to control the primary and secondary flows. The combined primary and secondary helium flows were introduced into the furnace below its sinter zone.

Thus, as the overclad preform was lowered into the furnace, the overclad layer was doped with the water vapor at an elevated temperature present in the furnace. As the wet overclad preform, or doped overclad preform, was lowered into the furnace, the overclad layer sintered to result in a glassy fiber preform which served as a precursor to an optical waveguide fiber. The glassy fiber preform was subsequently heated and drawn into an optical waveguide fiber.

Figure 3:
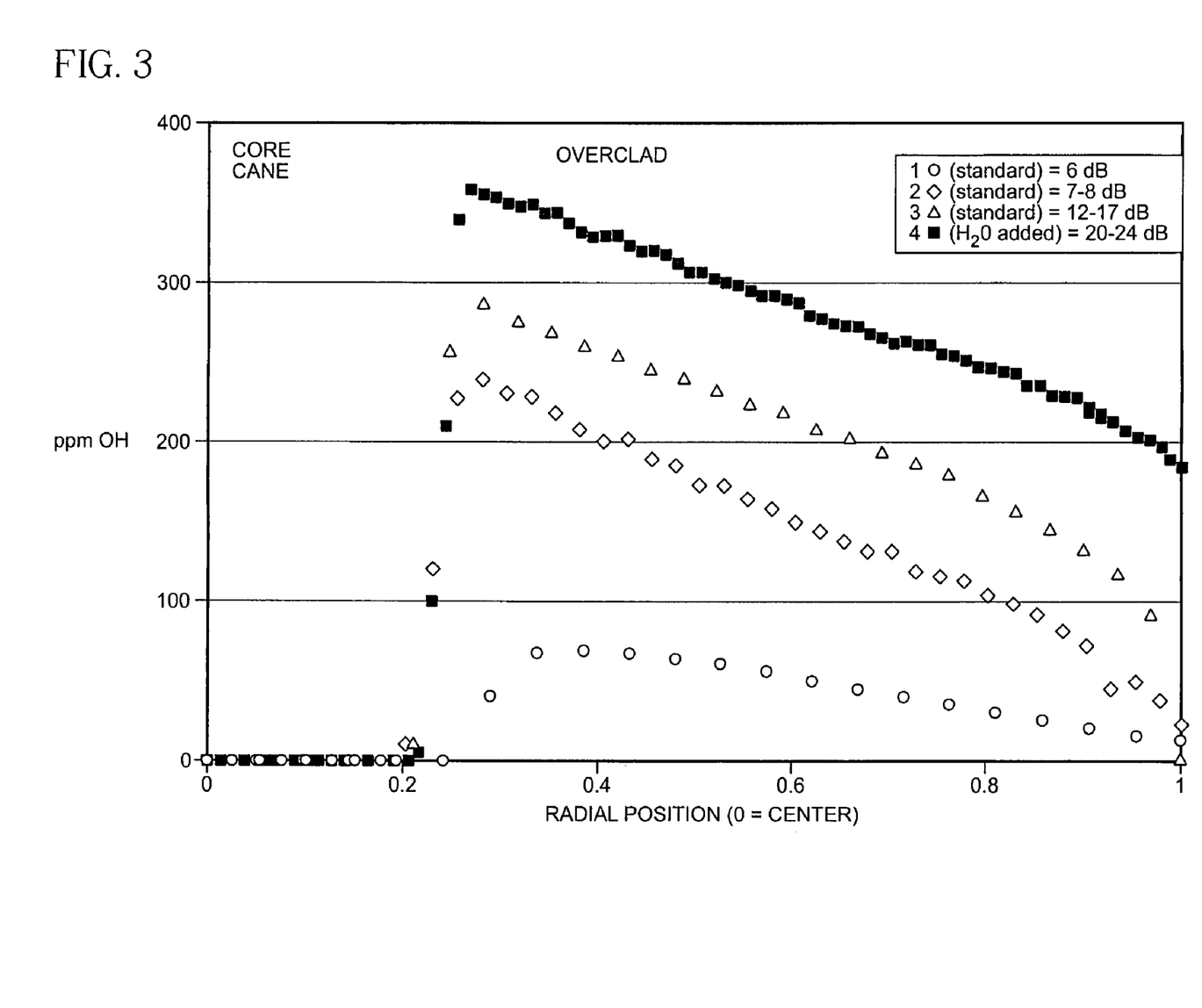
FIG. 3 is a graph showing radial profiles of water content in coupler fiber preforms, including the inventive fiber preform.

FIG. 3 is a graph illustrating measured profiles of water content versus normalized radii in respective glassy fiber preforms that were cross-sectioned and analyzed with infrared instrumentation. The core cane and inner cladding extended radially to about 0.2 normalized radius, and the overclad region extended radially from the outer periphery of the inner cladding at a normalized radius of about 0.2 to the outer periphery at the normalized radius of 1.0. FIG. 3 also represents the radial profiles of the optical waveguide fibers formed from the respective glassy fiber preforms, as the relative dimensions of the regions at a given cross-section are substantially preserved after drawing the fiber preform into a fiber. The fibers used in this example were step-index, single-mode fibers.

The first, second, and third profiles of FIG. 3 were obtained from three respective glassy preforms, each having had undried, undoped overclad layers, wherein the amount of water or water vapor that was contained in the overclad layer of the preforms, if any, was uncontrolled and was not removed by drying. Thus, the first, second and third profiles correspond to fibers with undried, undoped overcladding, and the fourth profile corresponds to a fiber with an overcladding doped with water according to the present invention. As seen in FIG. 3, the highest water content for the preforms/fibers having undried, undoped cladding, i.e. among the first, second and third profiles, was measured to be about 25 ppm OH substantially at or on the outer surface, or outer periphery, of the preform (or fiber). In contrast, the water content for the preform/fiber having a water doped cladding was measured to be about 190 ppm OH substantially at or on the outer surface or outer periphery of the preform/fiber.

We have found that the glassy optical fiber preform and/or fiber made in accordance with the above procedure results in a preform or fiber which is doped with water substantially uniformly in an axial direction, i.e. the radial profiles are substantially similar regardless of where the preform is sliced along its longitudinal axis. Accordingly, the present invention maximizes use of the entire preform and improves the productivity of both the fiber-making and the coupler-making processes. Furthermore, the present invention increases process control and improves quality and repeatability in the manufacture of fibers and optical components such as couplers made from such fibers. In contrast, we have noted that in the cases where prior fibers in which the happenstance introduction of water was uncontrolled, for example by relatively humid ambient conditions, i.e. wherein the overclad region was not doped with additional water so as to be subjected to a water atmosphere of higher than ambient humidity, the prior fibers exhibit substantial non-uniform axial trends. Furthermore, we have found that the present invention provides a marked reduction in the scrap rate associated with producing couplers according to prior known articles and processes. Moreover, the present invention provides increased process control in coupler manufacture, thereby allowing the manufacturer to focus on other process parameters, such as heating of the fibers to be coupled, draw rate, or matching of co-fibers, to name a few.

Each of the respective fibers represented in FIG. 3 were incorporated into a WDM coupler with a CS980 step-index single-mode co-fiber as found in a FiberGain™ module made by Corning Incorporated. Except for these respective fibers, each of the couplers was constructed in the same fashion. Coupler isolation was measured in each case within a wavelength range of 1500–1600 nm. The couplers containing the first fiber had a maximum isolation of about 6 dB within the 1500–1600 nm range. The coupler containing the second fiber had a maximum isolation of about 7 to 8 dB within the 1500–1600 nm range. The coupler containing the third fiber had a maximum isolation of about 12 to 17 dB within the 1500–1600 nm range. The coupler according to the present invention containing the fourth fiber had a maximum isolation of about 20 to 24 dB within the 1500–1600 nm range. WDM couplers typically benefit from high isolation values and low insertion loss. The present invention can facilitate the manufacture of optical couplers having isolation values of up to 24 dB and higher.

The present invention is not limited to Fiber Gain WDM couplers. Rather the present invention may be used in any variety of couplers such as fused-biconic-taper (FBT)

devices or overclad fused couplers such as the MultiClad™ line produced by Corning Incorporated.

As mentioned above, FIG. 1 illustrates a 2×2 coupler, but the present invention also applies to other configurations, such as a 1×2 coupler. Furthermore, more than 2 fibers can be joined at their waists to form an N×N coupler. One or more fibers may be severed from one end of an N×N coupler so that a plurality of fibers, unequal in number, extend from opposite ends of the coupler. Also, the inventive fiber can be utilized in an M×N fiber optic coupler, where $M \geq 1$ and $N \geq 2$ (e.g. 1×2, 2×2, etc., including tree, star, and wavelength-selective couplers, as well as tap or wavelength insensitive power-splitters, WDM's, etc.).

In a preferred embodiment, the core and cladding each have a respective refractive index which form a step-index profile. In one preferred embodiment, the fiber is capable of single mode operation at 1550 nm. In a preferred embodiment, the fiber preferably has a cable cutoff wavelength of less than or equal to about 1260 nm.

What is claimed is:

1. A method of manufacturing a glassy optical preform comprising the steps of:
   providing a preform comprising a silica soot layer; and then sintering the soot layer into a glassy layer;
   wherein the preform is controllably doped with water by exposing the soot layer to a gaseous water-containing atmosphere during the sintering step.

2. The method of claim 1 wherein, prior to the sintering step, the preform comprises a glass body adjacent the silica soot layer.

3. The method of claim 1 wherein the preform is exposed to a chlorine-free environment during sintering.

4. The method of claim 1 wherein, prior to the sintering step, the preform is a silica soot tube.

5. The method of claim 1 wherein the gaseous water-containing atmosphere comprises $H_2O$ and/or $D_2O$.

6. The method of claim 1 wherein the soot layer is not dried with chlorine.

7. The method of claim 1 wherein the preform contains at least 190 ppm water within at least 20% of an outer periphery of the preform.

8. The method of claim 1 wherein the preform contains at least 50 ppm water at or near an outer periphery of the preform.

9. The method of claim 1 wherein the preform contains at least 100 ppm water at or near an outer periphery of the preform.

10. The method of claim 1 wherein the preform contains at least 150 ppm water at or near a surface of the preform.

11. A method of manufacturing a glassy optical preform comprising the steps of:
    providing a preform comprising a silica soot layer;
    sintering the soot layer into a glassy layer;
    wherein water is selectively added to the preform by exposing the soot layer to a gaseous water-containing atmosphere during the sintering step.

12. The method of claim 11 wherein, prior to the sintering step, the preform comprises a glass body adjacent the silica soot layer.

13. The method of claim 11 wherein the preform is exposed to a chlorine-free environment during sintering.

14. The method of claim 11 wherein, prior to the sintering step, the preform is a silica soot tube.

15. The method of claim 11 wherein the gaseous water-containing atmosphere comprises $H_2O$ and/or $D_2O$.

16. The method of claim 11 wherein the soot layer is not dried with chlorine.

17. The method of claim 11 wherein the preform contains at least 190 ppm water within at least 20% of an outer periphery of the preform.

18. The method of claim 11 wherein the preform contains at least 50 ppm water at or near an outer periphery of the preform.

19. The method of claim 11 wherein the preform contains at least 100 ppm water at or near an outer periphery of the preform.

20. The method of claim 11 wherein the preform contains at least 150 ppm water at or near a surface of the preform.

* * * * *